United States Patent Office 3,576,903
Patented Apr. 27, 1971

3,576,903
EPOXY-TERMINATED ADDUCTS OF CARBOXY TERMINATED POLYESTERS AND POLYEPOXIDES
Gaylord L. Groff, North St. Paul, Minn., assignor to Minnesota Mining and Manufacturing Company, St. Paul, Minn.
No Drawing. Continuation-in-part of application Ser. No. 478,483, Aug. 9, 1965. This application Apr. 29, 1968, Ser. No. 725,213
Int. Cl. C08g 45/12, 45/14, 47/00
U.S. Cl. 260—824        8 Claims

ABSTRACT OF THE DISCLOSURE

Epoxy-terminated polymers comprising an adduct of an epoxy resin and an acid-terminated polymer having ester and amide linkages. The adduct includes at least two epoxide equivalent weights for each acid equivalent weights for each acid equivalent weight of acid-terminated polymer. These epoxy-terminated polymers are rapidly curable with appropriate hardeners and catalysts and yet form flexible products.

---

This application is a continuation-in-part of a pending application, Ser. No. 478,483, filed Aug. 9, 1965, now abandoned.

The present invention provides new, internally complex, epoxy-terminated polymers that cure rapidly with appropriate hardeners and catalysts but that also cure to a flexible state. Coatings based on or containing the new polymers cure within at least 20 or possibly 30 minutes at elevated temperatures, with most conventional hardeners and catalysts. Further, with the hardener-catalyst systems disclosed in the copending application of Groff and Ridihalgh, Ser. No. 699,364, filed Jan. 22, 1968, now Pat. No. 3,506,598, the polymers gel and cure to a flexible state in seconds. The new polymer resins may be used to provide coatings that are sufficiently elastic as to be elongatable in most cases at least greater than 8 or 10 percent of their original length, usually at least greater than 20 or even 40 percent of their original length, and up to 200 percent or even more of their original length (as measured on an Instron Tensile Tester). Their flexibility is additionally illustrated by the fact that wires carrying bonded, cured coatings of preferred highly flexible new compositions can be tied into knots without rupture of the insulative coating.

With respect specifically to powdered resins, the new epoxy-terminated polymers that are solid at room temperature, may be mixed and heated with heat-activatable room-temperature-stable hardeners and heat-activatable room-temperature-stable catalysts, and then rapidly cooled and pulverized, to form shelf-stable, powdered, modified resin compositions. These powdered resins are especially useful in suspension coating procedures: when directed against a heated workpiece, they rapidly fuse, adhere to the workpiece, flow together into a thin film and gel, and after a very short period of continued heating, cure as an infusible, tough protective layer that has good flexibility.

In general, the new epoxy-terminated polymers of this invention comprise a low-molecular-weight substantially completely reacted adduct of (1) an acid-terminated polymer having the formula:

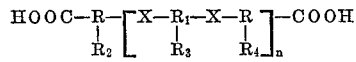

in which X is selected from ester and amide groups, and combinations of them; R and $R_1$ are selected from hydrocarbon groups, hydrocarbon groups having ether linkages, and hydrocarbon groups substituted with sulfone, sulfide, phosphonate, phosphine oxide, silane, and siloxane groups, and combinations of them; $R_2$ is selected from hydrocarbon groups, carboxyl, hydrogen, and halogen, and combinations of them; $R_3$ is selected from hydrocarbon groups, hydrogen, halogen, and X-R-COOH groups (where X and R have the above assigned designations), and combinations of them; and $R_4$ is selected from hydrocarbon groups, hydrogen, and halogen, and combinations of them; and $n$ is at least one; and (2) an epoxy compound containing on the average at least about 1.3 oxirane groups per molecule, said epoxy compound being present in the amount of at least two epoxide equivalent weights for each carboxyl equivalent weight of acid-terminated polymer present.

A wide variety of acid-terminated polymers—e.g., carboxyl-terminated polyesters, polyamides, and polyamide esters—have been found to have utility as a basic internal constituent of the resinous epoxy-terminated products of this invention. The acid-terminated polymers useful in this invention may be aliphatic, aromatic, cycloaliphatic or of mixed structure, and they may have ethylenic unsaturation and may be branched. These acid-terminated polymers are as a rule produced by the reaction of polybasic, usually dibasic, acids with polyols, polyamines, and amino-alcohols, using the acid in excess. In an alternative reaction, cyclic anhydrides are reacted with polyhydroxy compounds. Also having utility are polyesters prepared by the reaction of bisphenol diacetates with an excess of polybasic acids. Most generally the acid-terminated polymers are formed from polybasic acids and polyols in which the base parts of the molecule are saturated unsubstituted hydrocarbon groups; but they may also be made from such compounds at 4,4′-diamino diphenyl sulfone; 3,3′-thiodipropionic acid; dibutyl phenyl phosphonate or dibutyl phenyl phosphonic acid; tris [1- (2-methyl)aziridinyl] phosphine oxide; diphenyl-di-(2-aminoethoxy) silane; and n- (dimethoxy methyl silyl isobutyl) ethylene diamine. Phosphorous and halogen compounds have special utility in that polymers based on them exhibit flame resistance. Many of the saturated acid-terminated polymers have better thermal and color stability than the unsaturated polymers. The acid-terminated polyesters have been found to be especially useful in resinous products having high heat resistance, while the amide compounds have been found to give products of especially high solvent resistance. Because of their polar character the amide compounds are more likely to form solids at lower molecular weights.

The molecular weight of the acid-terminated polymer should exceed 250 and preferably 500 to achieve cured flexible products. If the polymer exceeds a molecular weight of 10,000 an epoxy-terminated adduct that is relatively slower in curing will result. Because increases in molecular weight tend to slow up curing, the molecular weight of the polymer is even more preferably less than 5,000. The polymer should have an acid content between about 0.3 and 8 milliequivalents per gram. Polymers having an average of 2 or 3 carboxyl groups per molecule are the most practical for use in this invention, but polymers with a higher number of carboxyl groups are also used. To reduce premature gelation during reaction of acid-terminated polymers of high carboxyl content with epoxy compound, a relatively large excess of epoxy compound is used.

The epoxy component of epoxy-terminated polymers of this invention should average at least about 1.3 oxirane groups per molecule to achieve epoxy termination. However, to prevent undue interreaction and even curing during the reaction of epoxy resin with acid-terminated polymer, it is preferred that the epoxy compound have not much more than two epoxy groups per molecule on the average. Particularly useful epoxy resins are the liquid or solid diglycidyl ethers of polyhydric phenols such as resorcinol or bisphenol A. Other useful epoxy resins include aliphatic diepoxides such as the diglycidyl ether of diethylene glycol and the diglycidyl ether of 1,4-butanediol. Also useful are cycloaliphatic diepoxides such as 3,4-epoxy-6-methylcyclohexyl methyl-3,4-epoxy-6-methylcyclohexane carboxylate; 1-epoxyethyl-3,4-epoxy-cyclohexane; 3- (3,4-epoxycyclohexane)-9,10 epoxy 2,4-dioxaspiro(5,5)undecane. Another useful diepoxide is 1,3-bis (3-glycidyloxypropyl) tetramethyl disiloxane.

In preparing epoxy-terminated adducts of this invention, at least two epoxide equivalent weights of epoxy compound are mixed with one carboxyl equivalent weight of acid-terminated compound, and the compounds are reacted to give an epoxy-terminated polymer. Higher ratios of oxirane groups to carboxyl groups, up to 8 or 10 to 1, are also used, as where the resulting adduct is to be used to provide final cured products of less flexibility; in such adducts the molecular weight of the polyester should generally be substantially higher than 500, as 1000 or 1500. To prepare epoxy-terminated adducts for use in powdered resin compositions, epoxy resins are preferably used in a large weight proportion, as in a proportion of four epoxide equivalent weights to one acid equivalent weight of acid-terminated polymer. Liquid or lower viscosity adduct compositions are obtained when the epoxy resin is sufficiently in excess to act as a diluent.

The relative molecular weights of the carboxyl-terminated polymer and epoxy resin components are also controlled to effect changes in the properties of the reacted adduct. To increase the flexibility of the product, longer carboxyl polymer molecules are called for and shorter epoxy resin molecules. To decrease flexibility, longer epoxy molecules, usually with aromatic groups, and shorter polymer molecules, are used. For preparation of cured products of high flexibility or rubbery character, it is preferred that the structure of the carboxyl polymer molecule be prepared from monomer units that are largely aliphatic. However, flexibility as well as good high temperature resistance can be obtained from polymer structures that are largely aromatic by employing higher molecular weight polymer molecules. (It should be understood that the extent of flexibility of the cured product, however, is not only dependent upon the carboxyl polymer structure and molecular weight, but also upon the epoxy resin structure, molecular weight and carboxyl-epoxy ratio, as well as the structure and quantity of reactive groups of the hardener employed.)

The reaction of acid-terminated polyester or polyamide with excess epoxy compound may be performed satisfactorily at temperatures varying within about 50°–220° C. For most reactions a temperature within 100°–180° C. is preferred. If desired, inert diluents or solvents are employed to reduce the viscosity of the product during reaction or are added at the conclusion of the reaction for liquid coating purposes. The reaction is conveniently carried out at atmospheric pressure, although pressures both above and below atmospheric can be employed. If high reaction temperatures are employed, it is generally desirable to exclude air during the reaction through use of an inert atmosphere such as nitrogen. Completion of the reaction to form the epoxy-terminated prepolymer or adduct product is conveniently indicated by measuring the acid number of the reaction mixture, which should preferably reach less than one.

An agent that catalyzes the reaction between an excess of epoxy groups with carboxyl groups is in most cases quite important to production of the epoxy-terminated polymers of this invention. It has been found that these catalysts, in speeding the epoxy-carboxyl reaction, minimize competing side reactions which cause excessive viscosity or gelation, and catalysts are especially important in preparing adducts from polymers that have side chains that promote premature gelation. Catalysts useful for this invention include tertiary amines and the salts thereof, quaternary amines, alkali metal alcoholates, alkali metal phenolates, alkali metal hydroxides, alkali metal salts of organic acids and alkali metal salts of inorganic acids. Examples of such catalysts are tris (2,4,6-dimethylaminomethyl) phenol (DMP–30), sodium methoxide, potassium phenolate, and lithium hydroxide. Particularly preferred catalysts are the essentially neutral alkali metal salts of organic and inorganic acids such as potassium acetate or sodium chloride. Adducts prepared using these preferred catalysts are stable over long periods of aging, even at elevated temperatures, whereas the less preferred catalysts that are alkaline or acidic tend to cause further reaction under such conditions leading to viscosity increases and ultimately to gelation. Significantly, we have found that some commercially available epoxy resins have sufficient quantities of sodium chloride retained from their manufacturing processes to effectively catalyze their reaction with acid-terminated polymers without additional catalyst. Residual sodium chloride salt contents as low as 30 parts/million (based on alkali metal analysis) have shown useful catalytic effects on epoxy-acid polymer adduct formation.

The epoxy-terminated product of this invention is blended with a curing agent to give a ready-to-use product. For suspension coating application, room-temperature-solid products of this invention are mixed with a hardener and catalyst on a rubber mill as described in the Winthrop et al. patent, U.S. Pat. No. 3,102,043. The mixing may be performed at approximately room temperature or just sufficiently higher temperatures at which the components fuse as an essentially homogenous solid mixture that is then rapidly cooled and reduced to a particulate form. When appropriately prepared as taught in the Winthrop patent, the product remains fusible and curable upon application to a heated workpiece.

The epoxy-terminated adduct product may also be mixed in solution with hardeners and catalysts for coating, saturating, casting, film-forming, or other uses. Especially in this form, the new epoxy-terminated resins are used in a variety of electrical insulation embodiments. Curable compositions based on the new resins are formed into nonreinforced, unsupported films for use as wrapping material. Electrical conductors are also coated with such curable compositions for insulative purposes. Liquid curable compositions based on the new resins are also used as saturants for flexible fibrous sheet materials, mica paper, etc. Some of these electrical insulation products may be in either a cured or uncured condition, the latter being curable after application on the job.

Suitable curing agents, which are normally added in stoichiometric amounts, include polybasic acids, cyclic anhydrides, cyclic dianhydrides, aromatic or aliphatic diamines, and other active hydrogen compounds known to react with epoxy resins. The curing reaction may be effected at temperatures between room temperature and about 250° C. Catalysts such as tertiary amines, stannic chloride, and boron trifluoride amine complexes may be employed to speed the reaction. The epoxy-terminated polymers also can be homopolymerized by the influence of catalytic agents such as tridimethyl amino methyl phenol and boron trifluoride complexes. Using aromatic amine curing agents and cocatalyst combinations as taught in the copending application of Groff and Ridihalgh, Ser. No. 699,364, curing times of 60 seconds or less are obtained.

The following examples further illustrate the invention.

EXAMPLE 1

A mixture of 45.4 kilograms of adipic acid and 25.5 kilograms of 1,4-butanediol was charged into a 75-liter stainless steel kettle and slowly brought to a temperature of 200° C. under a nitrogen atmosphere while water formed in the reaction distilled off. The reaction was allowed to proceed until water no longer evolved, and then, while heating continued, a vacuum of 14 mm.

mercury was applied for 5 hours to remove any remaining moisture. The product was poured out and cooled at room temperature until solid. It was found to have an acid number of 53.7, hydroxyl number of 2.0, and an average of 2.0 carboxyl groups per molecule.

This polyester in the amount of 14.4 kilograms (13.7 acid equivalent weights) was heated in a 75-liter stainless steel kettle until liquid. A charge of 54.4 kilograms of diglycidyl ether of bisphenol A (51.5 epoxide equivalent weights) having an average epoxide equivalent weight of 950 and a Durran's melting point of 95–105° C. (Araldite 6084) was added to the fused polyester, with stirring, over a period of one hour as the temperature was raised to 150° C. Reaction at this temperature was maintained for four hours. (Analysis of the Araldite 6084 showed it to contain 40 parts/million of sodium as sodium chloride.) The product of this reaction, a preferred epoxy-terminated polymer of this invention, when cooled to room temperature, was a brittle solid having an acid number of 0.1 and an epoxide equivalent weight of 1660.

This product was mixed in the following formulation on a two-roll rubber mill, with one roll heated to about 44° C., and then sheeted off in sheets of less than about one centimeter and cooled by circulating air.

|  | Grams |
|---|---|
| Epoxy-terminated polyester | 800.0 |
| 4,4'-methylene dianiline | 37.5 |
| Polymerized ethyl acrylate-long chain hydrocarbon (Modaflow) | 4.0 |

This composition was ground and screened through a 100-mesh screen. Aluminum wires of ⅛″ diameter preheated to 200° C. were coated with the particles passed through the screen by a suspension coating procedure and the coating cured for 15 minutes at 200° C. The coated wire was wrapped 360° around a ⅛″ mandrel without rupturing or cracking the coating.

Another formulation based on this adduct was similarly prepared in the following ratios:

|  | Grams |
|---|---|
| Epoxy-terminated polymer | 800.0 |
| Isophthalyl dihydrazide | 48.0 |
| Modaflow | 4.0 |

Particles of this formulation were similarly coated onto ⅛″ diameter aluminum wire and cured for 20 minutes at 200° C. This coated wire was also bent 360° around a ⅛″ mandrel without cracking. A 6-mil film prepared by spray coating the particles on a tin panel heated to 200° C. where the particles fused exhibited a tensile strength of 6900 pounds/square inch and an elongation at break of 48 percent.

EXAMPLE 2

A charge of 17.5 kilograms of adipic acid, 8.8 kilograms of isophthalic acid, 10.9 kilograms of propylene glycol, 1.45 kilograms of trimethylolpropane and 58.0 grams of triphenyl phosphite catalyst was placed in a 94-liter stainless steel kettle. The reaction was slowly brought to a temperature of 230° C. under a nitrogen atmosphere while water formed in the reaction was distilled off through a bubble cap column. When water no longer evolved, a vacuum of 15 mm. of mercury was applied with continued heating until the reacting materials exhibited an acid number of 53.0. The reaction was then terminated and the product poured out and cooled to room temperature where it solidified. This polyester had a hydroxyl number of 0.6 and an average of 3.0 carboxyl groups per molecule.

A 1008.2-gram charge (one acid equivalent weight) of the above polyester diluted to 92% solids with toluene was mixed with 1.52 grams (0.010 equivalent weight) of potassium trifluoroacetate in a 2-liter reaction flask. Three-hundred-eighty grams (2.00 epoxide equivalent weights) of diglycidyl ether of bisphenol A having an average epoxide equivalent weight of 190 (Epon 828) were added and the temperature raised to 145° C. After 1¾ hours at this temperature the acid number of the flask contents dropped from 42.3 to 2.0, and the mixture was poured out and cooled to a brittle solid having an epoxide equivalent weight calculated at 1390.

Four-hundred-eighty grams of a 25 percent solution (in a methyl ethyl ketone-toluene mixture) of this adduct was mixed with 31 grams of Epon 828, 37 grams of a hardener substantially comprising hexahydrophthalic anhydride containing a stabilizer (LA–1) and 0.5 gram of tris (2,4,6-dimethylaminomethyl) phenol (DMP–30). This mixture was coated out on a release carrier, dried for 10 minutes at 120° C. and cured for 20 minutes at 150° C. A film of 3.2 mils thickness was obtained having the following properties:

Tensile strength—3750 pounds/square inch
Elongation at break—200 percent
Percent dissolved in acetone at room temp. in 24 hours—7.9 percent
Dielectric constant—4.23
Dissipation factor—0.037

This film was aged in an oven for 1 week with results as follows:

Oven temperature—155° C.: weight loss, 0.7%; appearance, tough and flexible.
Oven temperature—180° C.: weight loss, 6.1%; appearance, stiffer but still tough and flexible. Would not crack on creasing.

EXAMPLE 3

Eight-hundred-fifty grams of polypropylene glycol (4.0 equivalent weights) having an average molecular weight of 425 and 400.0 grams of succinic anhydride (4.0 anhydride equivalent weights) were heated in a 2-liter flask with 170 milliliters of toluene at reflux for 4⅔ hours. The toluene was then stripped off. The remaining yellow, liquid polyether-ester had an acid number of 176.8, which corresponds to an equivalent weight of 317.3, and an average of 2.0 carboxyl groups per molecule.

A mixture of 317.3 grams (1.00 acid equivalent weight) of the above polyester, 390.0 grams (2.00 epoxide equivalent weights) of Epon 828, and 0.981 gram (.010 equivalent weight) of potassium acetate were dissolved in 78.6 grams of toluene and heated with stirring in a one-liter flask to a temperature of 150° C. The reaction temperature was maintained between 145°–150° C. for 45 minutes, and during this time the acid number fell from 71.3 to 0.32. The toluene was then stripped off under vacuum, leaving a final product that at room temperature had a viscosity of 152,000 centipoises. This adduct had an epoxide equivalent weight of 736.

About 70.0 grams of this adduct was mixed with 2.0 grams of diethylene triamine and the resulting mixture was cast into a mold and allowed to cure at room temperature. At room temperature the mixture gelled after 10 hours and cured after 6 additional hours. The sample was very tough and rubbery and had a Shore A hardness of 35. A sample of this mixture gelled in 30 minutes at 120° C. and cured after 1½ more hours, when it exhibited a Short A hardness of 65. A 17-mil film formed by coating the adduct-triamine mixture on a release surface and curing at 120° C. for 2 hours exhibited a tensile strength of 570 pounds/square inch and had an elongation at break of 110 percent.

The following example illustrates useful adducts formed from polyether-esters that are similar to the one of this example but prepared with maleic anhydride.

EXAMPLE 4

An acid-terminated ester having an acid number of 84, approximately two carboxyl groups per molecule and a molecular weight of slightly over 1300, and which comprised 86.37 parts by weight of polypropylene glycol having an average molecular weight of 1025 and 13.53 parts of maleic anhydride, was reacted with a diglycidyl ether of bisphenol A having an epoxide equivalent weight of about 950 and a Durran's softening point of 95–105° C. in a ratio of 20 to 100 parts (a ratio of 1 to 3.4 equivalent weights). The reaction was accomplished by heating a mixture of the ingredients to 149° C. and holding them at that temperature for two hours; catalysis of the reaction depended on the conventionally present residual salts in the epoxy resin. The resulting epoxy-terminated polymer had an acid number of one and an epoxide equivalent weight of about 2000.

When cooled to room temperature, the polymer solidified, and it was then ground to about 1/16" sizes. It was mixed with a polysebacic polyanhydride curing agent (Harcure A) on a two-roll rubber mill in the manner described in Example 1 in a ratio of 100 parts polymer to 10 parts curing agent; the resulting product was ground and screened through a 100-mesh screen. A fluidized bed of the powder was formed and 1/8" wires preheated to about 230° C. were dipped in the bed for 2–3 seconds and the resultant 8-mil coating then cured in an oven at 200° C. for 10 minutes. The wires were then bent around a 1/4" mandrel and the coating showed no cracking. A film of the epoxy-terminated polymer formed by suspension coating on a tin plate exhibited an elongation of 8–10%.

EXAMPLE 5

A mixture of 1820.0 grams of sebacic acid (9.00 moles) and 489.0 grams of 2-aminoethanol (8.00 moles) was heated slowly in a 3-liter reaction flask under nitrogen up to a temperature of 220° C. during which time water from the reaction distilled off. When water no longer evolved under these conditions a vacuum was applied down to 0.2 mm. mercury while heating continued in order to remove any remaining water. The cooled polyamide-ester was a solid having an acid number of 60.5, which corresponds to an equivalent weight of 927.6, and had an average of 2.0 carboxyl groups per molecule.

This polyamide-ester in an amount of 232.3 grams (0.250 acid equivalent weight) was heated with stirring to 150° C. and to this was added 945.0 grams (1.00 equiv.) of Araldite 6084 over a period of 20 minutes. This temperature was maintained for an additional 30 minutes before the mixture was poured out and cooled to room temperature. The acid number dropped from 11.9 to 0.25 during the reaction time and an adduct with an epoxide equivalent weight of 660 was obtained.

This adduct was mixed in the following formulation on a two roll rubber mill with one roll heated to 44° C., until a fused mixture was obtained and then sheeted off and cooled by circulating air.

| | Grams |
|---|---|
| Epoxy-terminated polyamide ester | 800.0 |
| 4,4'-methylenedianiline | 35.0 |
| Modaflow | 4.0 |

This mixture was ground and screened through a 100-mesh screen and coated by a suspension coating procedure onto 1/8" diameter aluminum wire preheated to 200° C. and the coating cured for 15 minutes at 200° C. This coated wire was bent 360° around a 1/8" mandrel without rupturing or cracking the coating.

EXAMPLE 6

A mixture of 1412.0 grams (5.00 equivalent weights) of a dimerized linoleic acid containing 83% dimer acid having a molecular weight of 565 and 17% trimer having a molecular weight of 845 (Empol 1018) and 423.5 grams of methylene daniline (4.27 equivalent weights) was heated in a 3-liter flask up to a temperature of 264° C. under nitrogen, and water from the reaction was distilled off. When evolution of water ceased after 5 hours of reaction, the product was cooled by pouring into trays. The clear, amber, solid polyamide produced had an acid number of 23.4 and a measured molecular weight of 3500, and an average of 2.17 carboxyl groups per molecule.

One-hundred-seventeen grams (0.60 epoxide equivalent weights) of Epon 828 was mixed with 318.0 grams of xylene that had been heated to 125° C.; 359.7 grams (0.15 acid equivalent weight) of the above polyamide was first added to the solution over a period of 30 minutes after which 0.15 gram (0.0015 equivalent weight) of potassium acetate were added. The temperature was then brought to the reflux temperature of 135–138° C. which was maintained for an additional 4½ hours while the acid number dropped from 10.6 for the solvent mixture to 0.6 for the adduct solution. An epoxide equivalent weight of 1720 based on a 100 percent solids mixture was obtained for this adduct.

This adduct forms infusible, flexible, tough, adherent compositions when cured with conventional epoxy curing agents such as anhydrides and polyamines.

EXAMPLE 7

A charge of 471 kilograms of epsilon-caprolactone, 24.6 kilograms of trimelitic anhydride, 0.9 kilograms of isopropoxytitanium stearate catalyst, and 225 grams of distilled water was placed in a 75-liter kettle. The temperature of the reaction mixture was raised to 180° C. under a nitrogen atmosphere and held at temperature until the refractive index of the product measured at 60° C. reached 1.4670. A vacuum of 15 mm. mercury pressure was then applied at temperature for 4 hours. The resulting polyester had an acid number of 51.1, which corresponds to an equivalent weight of 1098.3, and an average of 3.0 carboxyl groups per molecule.

A mixture of 399.9 grams (0.364 acid equivalent weight) of the above polyester, 910.3 grams (1.456 epoxide equivalent weights) of diglycidyl ether of bisphenol A having an average epoxide equivalent weight of 625 (Araldite 7072) and 0.25 gram (0.0033 equivalent weight) of potassium chloride was heated to 150° C. with stirring. The reaction was continued at this temperature for 6 hours while the acid number dropped from 15.6 to 2.2. The product cooled as a solid, and an epoxide equivalent weight of 1300 was measured for it.

This adduct forms infusible, tough, leathery, and strong compositions when cured with conventional epoxy curing agents.

EXAMPLE 8

A mixture of 290 kilograms of adipic acid, 174 kilograms of neopentyl glycol, 10.2 kilograms of trimethylol propane and one kilogram of triphenyl phosphite catalyst was charged into a 75-liter reaction kettle and heated under nitrogen up to a temperature of 200° C. while water formed in the reaction was distilled off. When evolution of water ceased a vacuum of 15 mm. mercury was applied until an acid number of 60.9 was obtained, corresponding to an acid equivalent weight of 920.9. This polyester had an average of 2.5 carboxyl groups per molecule.

A mixture of 920.9 grams (1.00 acid equivalent weight) of the above polyester, 280.0 grams (2.00 epoxide equivalent weights) of 3,4-epoxycyclohexyl methyl-3,4-epoxycyclohexane carboxylate having an average epoxide equivalent weight of 140 (Unox 221) and 1.52 grams (0.01 equivalent weight) of potassium trifluoroacetate was heated to 140° C. with stirring for 2 hours. During this time the acid number fell from 46.7 to 0.3. The product cooled as a viscous liquid and had a final epoxide equivalent weight of 1368.

This adduct form tough, infusible, and very flexible products when cured with conventional curing agents.

EXAMPLE 9

A mixture of 618.5 grams of the diacetate of bisphenol A (3.96 equivalent weights) and 444.4 grams of sebacic acid (4.40 equivalent weights) was heated under nitrogen up to a temperature of 240° C. while acetic acid was distilled off. When evolution of acetic acid ceased at atmospheric pressure, a vacuum down to 0.25 mm. mercury was applied at temperature for 2 hours. The light amber solid obtained had an acid number of 30.3, and an average of 2.0 carboxyl groups per molecule.

About 380 grams (0.40 epoxide equivalent weights) of Araldite 6084 were dissolved in 376.7 grams of xylene by heating the xylene to 125° C. The above polyester in the amount of 185 grams (0.10 equivalent weights) was added to this hot solution over a period of 15 minutes and the temperature then raised to reflux at 138–140° C. and held there for 16½ hours. During this time the acid number dropped from 10 for the mixture to 0.8 for the adduct, which was found to have an epoxide equivalent weight of 2535 (measured on a 100 percent solids sample from which the solvent had been evaporated).

This adduct was mixed with the adduct of Example 8 in the following mixture, which was then diluted to 50 percent solids with a solvent mixture of methyl ethyl ketone and toluene.

| | Grams |
|---|---|
| Epoxy-terminated polyester of this example | 39 |
| Epoxy-terminated polyester of Example 8 | 19.5 |
| LA–1 | 5.5 |
| DMP–30 | 0.17 |

This solution was coated onto #18 copper wire and the coating cured at 200° C. for 15 minutes to a final coating thickness of 2.25 mils. When a section of this wire was elongated rapidly until it broke, the coating necked down with and broke cleanly with the wire. The wire was wrapped around its own diameter without rupturing or cracking the coating. The coating had the following electrical properties:

Dielectric constant (at 23° C., 100 cycles/second)—3.28
Dissipation factor (at 23° C., 100 cycles/second)—0.017
Dielectric strength—2300 volts/mil
Volume resistivity—$4.3 \times 10^{14}$ ohm-centimeters

EXAMPLE 10

A mixture of 1110.6 grams (1.01 acid equivalent weights) of the polyester of Example 2, 790.6 grams (4.05 equivalent weights) of Epon 828 and 1.0 grams (0.01 equivalent weight) of potassium acetate was diluted to 88% solids by addition of 259.4 grams of toluene. The reaction mixture was heated to reflux at 140° C. for 3 hours at which time it had attained an acid number of 0.3. After removal of the toluene, this product was found to have an epoxide equivalent weight of 625.

A plastic electrical insulating tape backing was prepared by curing the following formulation on a release carrier for 20 minutes at 150° C.

| | Grams |
|---|---|
| 80 weight percent solution of the adduct of the example in toluene | 300.0 |
| Substantially hexahydrophthalic anhydride containing a stabilizer (LA–1) | 47.4 |
| Symmetrical bi - beta-naphthyl-para-phenylene - diamine (AgeRite White) | 0.6 |
| Colloidal silica (CabOSil M5) | 14.4 |
| Crystalline silica (Min-U-Sil 5) | 43.0 |
| Chemically pure iron oxide (Mapico Brown) | 7.2 |
| Toluene | 32.0 |
| Methyl ethyl ketone | 62.0 |
| Tris (2,4,6 dimethylaminomethyl) phenol (DMP–30) | 0.84 |

The 6.0-mil film obtained had the following properties:

Tensile strength at break—2640 pounds/square inch
Elongation at break—225 percent
Dielectric constant (at 23°C.)—4.26
Dissipation factor (at 23° C.—.065
Dielectric strength—Dry 1495 volts/mil; wet 1150 volts/mil
Amount dissolved in acetone at room temperature after 24 hours—14.4 weight percent.

Within the broad range of acid-terminated polymers useful to form the new epoxy-terminated resins is a more limited group as set forth below; those in the formula below are particularly desired from the standpoint of the improved balance of properties obtained consistent with the use of relatively more economical, well-known, and available raw materials:

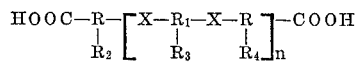

in which X is preferably an ester linkage but may also be an amide linkage; R and $R_1$ are preferably alkyl or aryl groups and combinations of them, but may also include cycloalkyl groups; $R_2$ and $R_4$ are preferably selected from hydrogen and alkyl groups and their combinations, but may also include halogen, aryl and cycloalkyl groups and combinations of them; and $R_3$ is preferably selected from hydrogen and alkyl groups and combinations of them, but also may include halogen, aryl, cycloalkyl and X—R—COOH groups and combinations of them; and $n$ is at least one. Similarly, glycidyl ethers of polyhydric phenols, especially the diglycidyl ether of bisphenol A, are preferably used with these acid-terminated polymers.

What is claimed is:
1. A method for forming curable epoxy-based compositions comprising
 (A) forming a low-molecular-weight epoxy-terminated polymer by reacting to a low acid number a mixture of
  (1) an acid-terminated polymer having the formula:

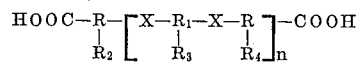

in which X is selected from ester and amide groups, R and $R_1$ are selected from hydrocarbon groups, hydrocarbon groups having ether linkages, and hydrocarbon groups substituted with sulfone, sulfide, phosphonate, phosphine oxide, silane, and siloxane groups, and combinations of them; $R_2$ is selected from hydrocarbon groups, carboxyl, hydrogen, and halogen, and combinations of them; $R_3$ is selected from hydrocarbon groups, hydrogen, halogen, and X—R—COOH groups (where X and R have the above assigned designations), and combinations of them; and $R_4$ is selected from hydrocarbon groups, hydrogen, and halogen, and combinations of them; and $n$ is at least one; and
  (2) an epoxy compound containing on the average at least about 1.3 oxirane groups per molecule, said epoxy compound being present in the mixture in the amount of at least two epoxide equivalent weights for each carboxyl equivalent weight of acid-terminated polymer present;
 (B) stopping the reaction of the acid-terminated polymer and epoxy compound to form an epoxy-terminated polymer that is fusible, soluble, and reactive with epoxy-reactive crosslinking agents; and then
 (C) blending the epoxy-terminated polymer and an epoxy-reactive crosslinking agent in approximately stoichiometric proportions.
2. A method of claim 1 in which, with respect to the acid-terminated polymer, R and $R_1$ are selected from alkyl, aryl, and cycloalkyl groups, and combinations of them; $R_2$ and $R_4$ are selected from hydrogen, halogen, alkyl, aryl, and cycloalkyl groups, and combinations of them; and $R_3$ is selected from hydrogen, halogen, alkyl, aryl, and X—R—COOH groups (where X and R have the above assigned designations), and combinations of them; and the acid-terminated polymer has an acid content between 0.3 and 8 milliequivalents per gram and an average molecular weight between about 500 and 5000.

3. A storage-stable curable epoxy-based composition that comprises a blend in approximately stoichiometric proportions of
(A) a low-molecular-weight fusible soluble reactive epoxy-terminated polymer that has a low acid number and is the substantially completely reacted adduct of
  (1) an acid-terminated polymer having the formula:

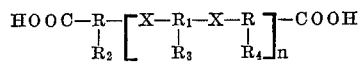

in which X is selected from ester and amide groups, R and $R_1$ are selected from hydrocarbon groups, hydrocarbon groups having ether linkages, and hydrocarbon groups substituted with sulfone, sulfide, phosphonate, phosphine oxide, silane, and siloxane groups, and combinations of them; $R_2$ is selected from hydrocarbon groups, carboxyl, hydrogen, and halogen, and combinations of them; $R_3$ is selected from hydrocarbon groups, hydrogen, halogen, and X—R—COOH groups (where X and R have the above assigned designations), and combinations of them; and $R_4$ is selected from hydrocarbon groups, hydrogen, and halogen, and combinations of them; and $n$ is at least one; and
  (2) an epoxy compound containing on the average at least about 1.3 oxirane groups per molecule, said epoxy compound being present in the amount of at least two epoxide equivalent weights for each carboxyl equivalent weight of acid-terminated polymer present; and
(B) an epoxy-reactive crosslinking agent.

4. A composition of claim 3 in which, with respect to the acid-terminated polymer, R and $R_1$ are selected from alkyl, aryl and cycloalkyl groups, and combinations of them; $R_2$ and $R_4$ are selected from hydrogen, halogen, alkyl, aryl, and cylcoalkyl groups, and combinations of them; and $R_3$ is selected from hydrogen, halogen, alkyl, aryl, and X-R-COOH groups (where X and R have the above assigned designations), and combinations of them ; and the acid-terminated polymer has an acid content between 0.3 and 8 milliequivalents per gram and an average molecular weight between about 500 and 5000.

5. A fibrous web saturated by a composition of claim 3.

6. Self-supporting sheet material comprising reconstituted mica paper impregnated by a composition containing the epoxy-terminated polymer defined in claim 1.

7. A particulate, normally solid and brittle coating material that initially thermosoftens on a heated workpiece disposed in a suspension of said particles and subsequently gels and cures on the workpiece as a flexible, strong, tough, heat- and chemical-resistant, and well-bonded coating comprising a blend in mutually interreactive proportions of
(A) a low-molecular-weight room-temperature-solid fusible soluble reactive epoxy-terminated polymer that has a low acid number and is the substantially completely reacted adduct of
  (1) an acid-terminated polymer having the formula:

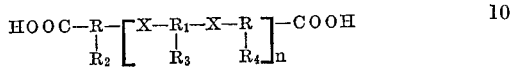

in which X is selected from ester and amide groups, R and $R_1$ are selected from hydrocarbon groups, hydrocarbon groups having ether linkages, and hydrocarbon groups substituted with sulfone, sulfide, phosphonate, phosphine oxide, silane, and siloxane groups, and combinations of them; $R_2$ is selected from hydrocarbon groups, carboxyl, hydrogen, and halogen, and combinations of them; $R_3$ is selected from hydrocarbon groups, hydrogen, halogen, and X-R-COOH groups (where X and R have the above assigned designations), and combinations of them; and $R_4$ is selected from hydrocarbon groups, hydrogen, and halogen, and combinations of them; and $n$ is at least one; and
  (2) an epoxy compound containing on the average at least about 1.3 oxirane groups per molecule, said epoxy compound being present in the amount of at least two epoxide equivalent weights for each carboxyl equivalent weight of acid-terminated polymer present;
(B) a room-temperature-solid heat-activatable epoxy-reactive crosslinking agent in approximately stoichiometric proportions for reaction with the epoxy-terminated polymer; and
(C) a room-temperature-solid heat-activatable catalytic accelerator for increasing the rate of reaction between the polymer and crosslinking agent.

8. A coating material of claim 7 in which, with respect to the acid-terminated polymer, R and $R_1$ are selected from alkyl, aryl and cycloalkyl groups, and combinations of them; $R_2$ and $R_4$ are sleected from hydrogen, halogen, alkyl, aryl, and cycloalkyl groups, and combinations of them; and $R_3$ is selected from hydrogen, halogen, alkyl, aryl, and X-R-COOH groups (where X and R have the above assigned designations), and combinations of them; and the acid-terminated polymer has an acid content between 0.3 and 8 milliequivalents per gram and an average molecular weight between about 500 and 5000.

References Cited
UNITED STATES PATENTS

| | | | |
|---|---|---|---|
| 2,891,034 | 6/1959 | Fisch | 260—835 |
| 3,027,279 | 5/1962 | Kurka | 260—835 |
| 3,262,987 | 7/1966 | McGary | 260—835 |
| 3,275,606 | 9/1966 | Kujawa | 260—835 |
| 3,278,636 | 10/1966 | Wynstra | 260—835 |
| 3,281,495 | 10/1966 | Heinen | 260—835 |
| 3,297,782 | 1/1967 | Barkis | 260—835 |
| 3,309,334 | 3/1967 | Holub | 260—835 |
| 3,340,212 | 9/1967 | Tomita | 260—835 |

PAUL LIEBERMAN, Primary Examiner

U.S. Cl. X.R.

260—47EA, 830P, 830R, 835, 836, 837R; 117—123D, 132BE, 135.1